United States Patent [19]
Oka

[11] Patent Number: 6,018,413
[45] Date of Patent: Jan. 25, 2000

[54] LIGHT SOURCE UNIT, OPTICAL MEASUREMENT APPARATUS AND EXPOSURE APPARATUS USING THE SAME UNIT

[75] Inventor: Michio Oka, Tokyo, Japan

[73] Assignee: Sony Corporation, Tokyo, Japan

[21] Appl. No.: 09/064,325

[22] Filed: Apr. 22, 1998

[30] Foreign Application Priority Data

Apr. 23, 1997 [JP] Japan ............................... P09-105876

[51] Int. Cl.⁷ ...................................................... G02F 1/35
[52] U.S. Cl. ........................................ 359/326; 359/332
[58] Field of Search ................ 372/21, 22; 359/326–332

[56] References Cited

U.S. PATENT DOCUMENTS

| 5,022,732 | 6/1991 | Engan et al. ........................ 359/326 X |
| 5,274,494 | 12/1993 | Rafanelli et al. ....................... 359/327 |

FOREIGN PATENT DOCUMENTS

| 1-220879 | 9/1989 | Japan ............................... H01S 3/109 |
| 4-25087 | 1/1992 | Japan ............................... H01S 3/139 |
| 4-243177 | 8/1992 | Japan ............................... H01S 3/109 |
| 5-243661 | 9/1993 | Japan ............................... H01S 3/109 |

OTHER PUBLICATIONS

M. Oka et al., "1 W Continuous–Wave 266 NM Radiation from an all Solid–State Frequency Quadrupled ND: Yag Laser," ASSL Technical Digest 1993, pp. 374–376.

L. Liu et al., "Compact All–Solid–State Continuous–Wave 1.5 Watt Laser Source at 266 NM," The 55th Meeting of the Japan Society of Applied Physics 1994, Extended Abstracts No. 20P–ML–5, p. 1219.

*Primary Examiner*—John D. Lee
*Attorney, Agent, or Firm*—Limbach & Limbach LLP

[57] ABSTRACT

A laser light source unit generates second higher-harmonic waves or sum-frequency waves by using an external resonator. The light source unit has a wavelength converter which incorporates an external resonator. A modulator spatially modulates the output light from the converter, thereby removing speckle noise. An optical waveguide propagates the laser light from the modulator to a given optical apparatus. The wavelength converter, the modulator, and the optical waveguide are mechanically separated. Moreover, vibration isolating members are provided to inhibit vibrations. Thus, any change in the length of the resonator or the optical axis caused by external vibrations is prevented. Further, a speckle pattern generated in propagating through an optical fiber is eliminated.

16 Claims, 8 Drawing Sheets

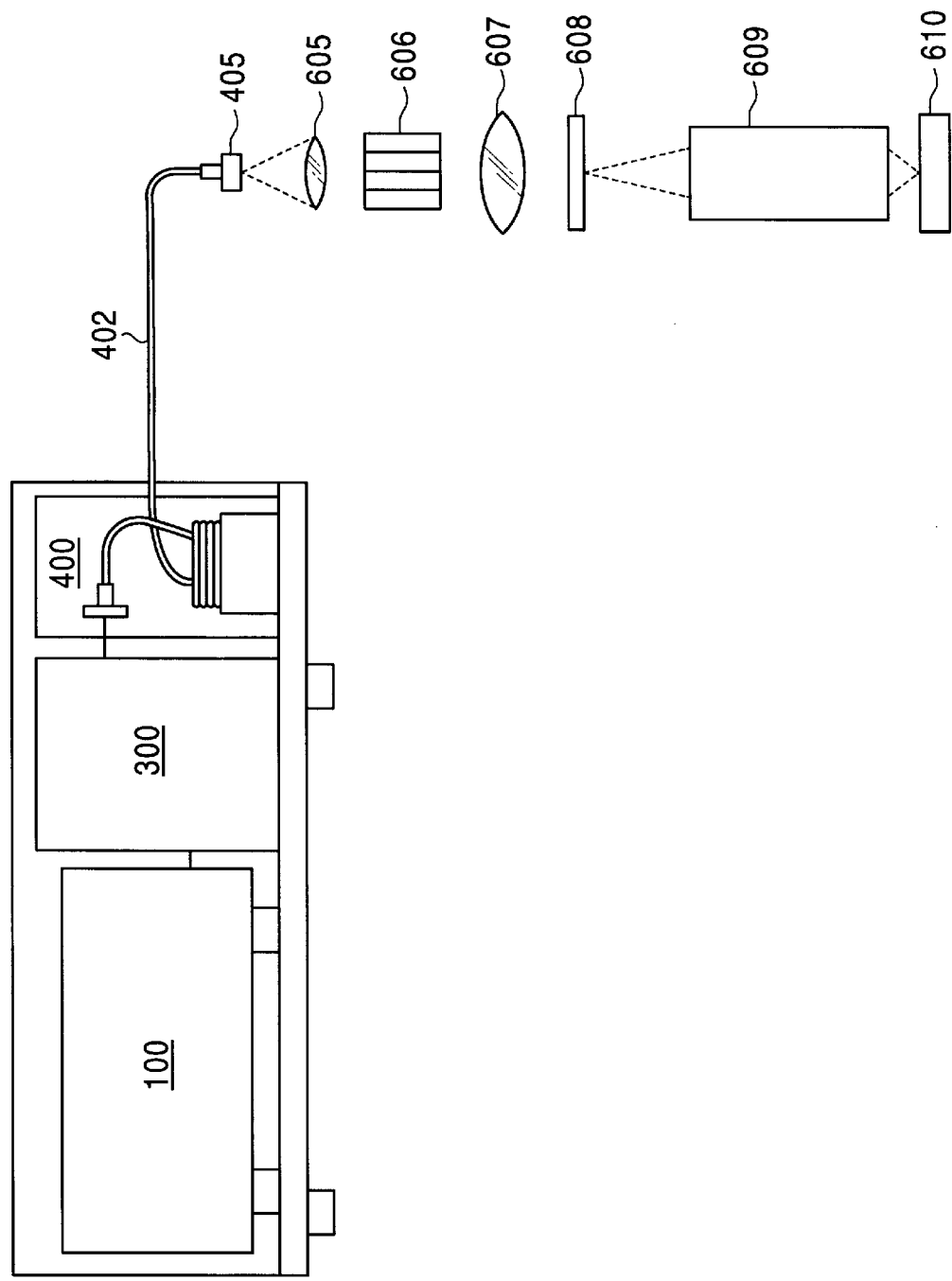

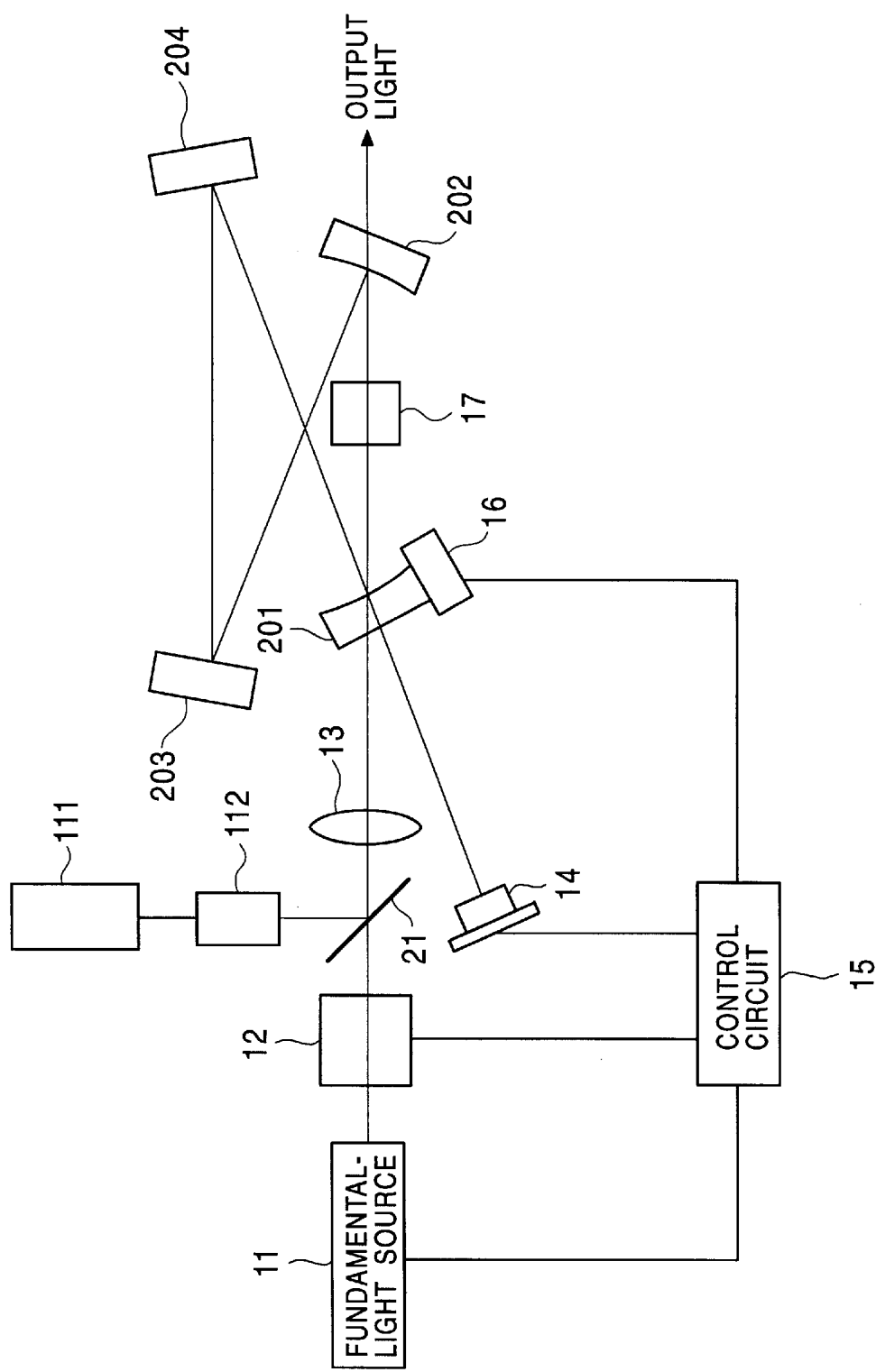

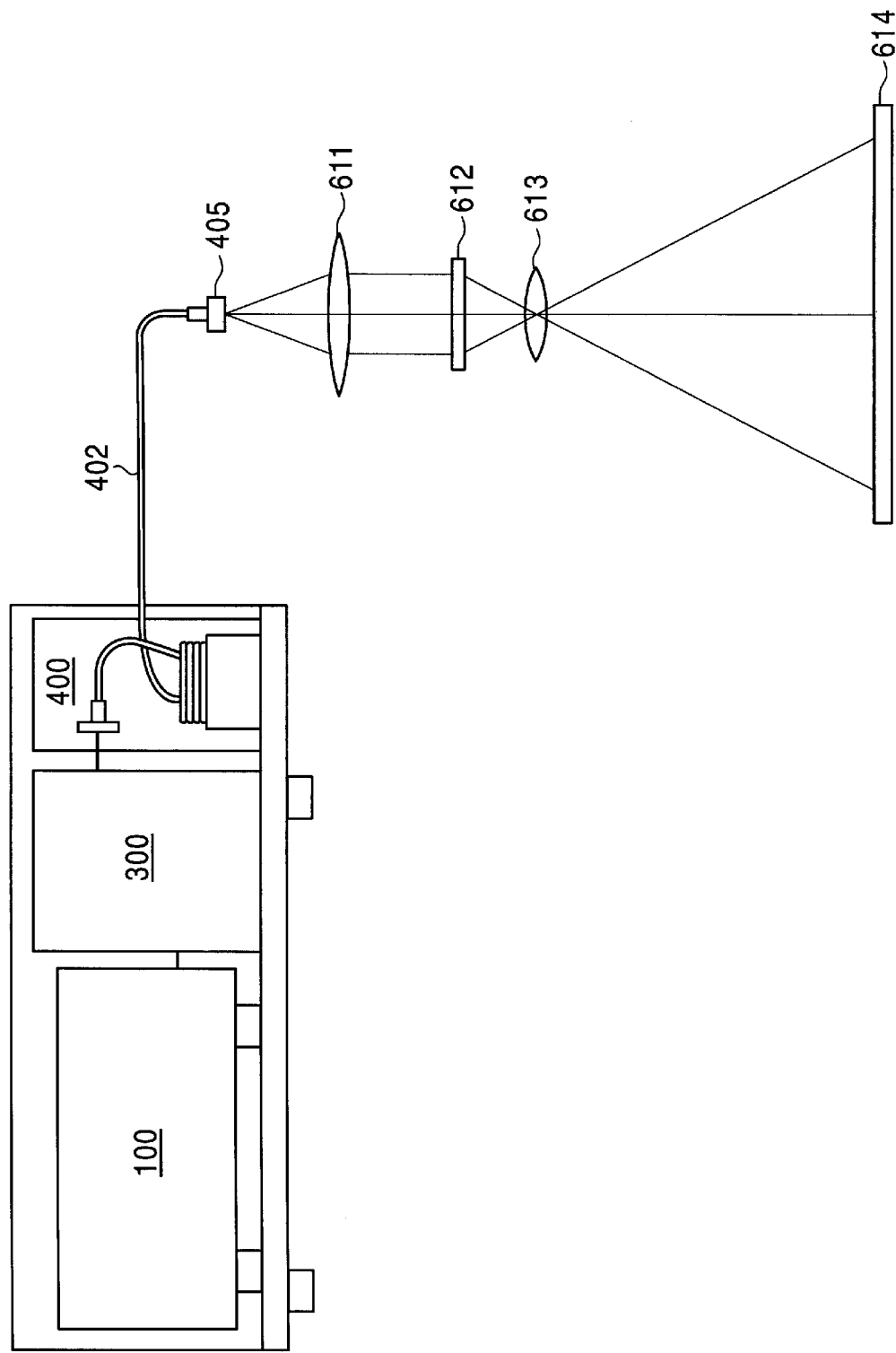

LIGHT SOURCE UNIT, OPTICAL MEASUREMENT APPARATUS AND EXPOSURE APPARATUS USING THE SAME UNIT

BACKGROUND OF THE INVENTION

1. Field of the Invention

The present invention generally relates to laser light source units. More particularly, the invention relates to a laser light source unit which generates sum frequency light or higher-harmonic light by using a non-linear optical crystal device according to an external resonance method. The invention is also concerned with an optical measurement apparatus and an exposure apparatus, both of which use output light from the above type of laser light source unit.

2. Description of the Related Art

Hitherto, a laser-light generating unit that efficiently performs waveform conversion by utilizing a high level of power density inside a laser resonator has been proposed. For example, second higher harmonic generation (SHG) according to an external resonance method and SHG by using a non-linear optical device disposed in a laser resonator have been attempted. As an example of the former type of external-resonator-type SHG, the SHG obtained by using $\beta$-BaB$_2$O$_4$ (BBO) is disclosed in Japanese Unexamined Patent Publication No. 5-243661. Further, as examples of the latter type of SHG by using a non-linear optical device within a laser resonator, the SHG generated by using KTiOPO$_4$ (KTP) is disclosed in Japanese Unexamined Patent Publication Nos. 1-220879, 4-25087, and 4-243177. These publications reveal that the phase of second higher-harmonic wave laser light is matched to the phase of a fundamental wave laser light by using a non-linear optical crystal device disposed within a laser resonator, thereby efficiently extracting second higher-harmonic laser light.

As an example of conventionally used external-resonance-type laser-light generating units, a SHG laser-light generating unit using BBO operable by a ring external resonator is shown in the schematic diagram of FIG. 1.

Referring to FIG. 1, fundamental-wave light emitted from a fundamental-wave light source 11 is incident on an external resonator 200 via a phase modulator 12 and a condenser lens 13. The phase modulator 12 is used for obtaining an error signal for controlling the length of the resonator. The external resonator 200 is formed of two concave mirrors 18 and 19 and a flat mirror 20, as specified in Table 1.

TABLE 1

| Mirror | Radius of curvature | fundamental-wave reflectivity (532 nm) | SHG light transmittance (266 nm) |
|---|---|---|---|
| 18 | 50 mm | 99.9% | — |
| 19 | 50 mm | 99.9% | 90.0% or higher |
| 20 | Flat | 99.9% | — |

An electromagnetic actuator 16 is used for positioning the concave mirror 18, and a non-linear optical device 17 is disposed within the external resonator 200. Fundamental-wave incident light from the external resonator 200 is partially reflected by the plane mirror 20 and is detected by a photo-detector 14. By using a detection signal output from the photo-detector 14, a control circuit 15 causes the electromagnetic actuator 16 to suitably position the mirror 18, thereby maximizing resonance for the incident light. As a consequence, SHG light is efficiently obtained from the non-linear optical device 17. The method for controlling the positioning of a concave mirror is disclosed in Japanese Unexamined Patent Publication No. 5-243661.

The non-linear optical device 17 is formed by, for example, BBO, which is coated with a reflection protective film for reducing the loss incurred in the resonator 200. Further, high-reflectivity mirrors having a reflectivity as high as 99.9% are employed as the resonator mirrors 18 and 19. In the laser light generating unit constructed as described above, the loss in the resonator representing the initial characteristics can be reduced to 0.5% or lower. As disclosed in the following technical documents (A) and (B), high-output ultraviolet SHG light of 1 W or higher is obtained with a 50% conversion efficiency.

(A) M. Oka, L. Y. Liu, W. Wiechmann, N. Eguchi, and S. Kubota "1 W Continuous Wave 266 nm Radiation from an All Solid-State Frequency Quadrupled Nd: YAG Laser" in Proceedings of Advanced Solid State Lasers (OSA, Washington D.C. 1994) pp. 374–376

(B) L. Liu, M. Oka, W. Wiechmann, N. Eguchi, M. Takeda, H. Suganuma, S. Kubota "Extended Abstracts (The 55th Autumn Meeting, 1994) No. 20P-ML-5, pp. 1219; The Japan Society of Applied Physics It is possible to generate ultraviolet light with a high efficiency, as discussed above. In the above type of laser-light generating unit, however, as disclosed in the following technical document (C), the length of the fundamental-wave light source and the length of the resonator are required to be continuously adjusted with very high precision, and the adjusted lengths should be maintained, since both elements are highly vulnerable to external vibrations.

(C) M. Oka, N. Eguchi, H. Masuda, S. Kubuta "External-Resonator-Type 0.1-W Ultraviolet Laser Using Sub-angstrom Positioning Device" Proceeding of Sony Research Forum 1991, pp. 298–303 (1991).

Accordingly, the above type of laser-light generating unit should be used on a vibration isolating device which employs a rubber damper or a pneumatic spring. This hampers wide applications of this unit as a light source for optical measurement apparatuses and exposure apparatuses. The above drawback seems to be overcome by isolating vibrations occurring in an overall optical measurement apparatus or an exposure apparatus including the laser-light generating unit. However, this inevitably enlarges the apparatus. Also, a vibration source provided for the apparatus eliminates the effect of isolating vibrations. The laser-light generating unit may be installed separately from an optical measurement apparatus or an exposure apparatus so as to isolate vibrations in the unit and the apparatus. However, this may cause the optical axis to deviate from the correct position when vibrations are generated.

Further, the following arrangement may be considered. Light output from the laser-light generating unit may be transmitted in an optical waveguide, such as an optical fiber, so that the laser-light generating unit is optically coupled to an optical measurement apparatus or an exposure apparatus but is mechanically separated therefrom. The U.S. Pat. No. 4,011,403 discloses an example of the above arrangement. Laser light 40 output from a laser light source 41 is propagated, as illustrated in FIG. 2, to the vicinity of an object 60 to be irradiated with the light 40 by using a transverse multi-mode optical fiber 50. Thus, the laser light source 41 is completely separated from an optical apparatus using output light from the light source 41.

Generally, a uniform and even intensity distribution is required for exposure light or illumination light. By propagating laser light through a transverse multi-mode optical fiber, however, a non-uniform speckle pattern caused by laser light coherence in which the intensity distribution randomly varies is generated on an object to be irradiated with laser light. This prevents the use of such laser light for illumination or exposure.

Accordingly, the U.S. Pat. No. 4,011,403 suggests that the incident light axis or the optical waveguide (optical fiber) is vibrated to average the nonuniform speckle pattern, thereby achieving a uniform intensity distribution. The above publication specifically discloses the embodiment shown in FIG. 2. In that embodiment, krypton ion laser light (visible light) 40 emitted from the laser light source 41 is incident on an input face 48 of the optical fiber 50 via a condenser lens 44. The incident light is then emitted from an output face 54 of the optical fiber 50 and is further applied to the object 60. Then, the condenser lens 44 and the optical fiber 50 placed in the optical path of the laser light are vibrated by electromagnetic vibrators 64 and 68. Further, a light diffusion plate 63 is interposed between the output face 54 of the optical fiber 50 and the object 60 so as to remove the speckle pattern.

However, as discussed above, a light source unit which uses an external resonator as a laser-light generating unit is vulnerable to vibrations. Due to the addition of the above-described vibrators, the output from this light source unit may become unstable. Additionally, an experiment aimed at removing the speckle pattern by vibrating the optical axis of incident light onto an optical fiber or an optical waveguide was performed by using ultraviolet laser light output from a laser-light generating unit, such as the one shown in FIG. 1. In this experiment, laser light having a wavelength of 266 nm, and an optical fiber having a core diameter of 600 $\mu$m and an numerical aperture of 0.22, which was suited for illumination and exposure, were used. It has been proved through this experiment that the speckle pattern was not completely removed.

For eliminating the speckle pattern caused by the use of a multi-mode optical fiber, it is important to excite as many modes as possible. The total number of modes in a multi-mode optical fiber is nearly proportional to the square of the reciprocal of the wavelength. Accordingly, the total number of modes in the ultraviolet range is four or five times as great as that in visible light. Thus, a larger number of modes should be excited for the ultraviolet light.

In the foregoing embodiment disclosed in the U.S. Pat. No. 4,011,403, it can be inferred that because of the use of visible laser light, multiple modes were able to be excited by vibrating the optical axis of the incident light or the optical fiber. In contrast, among the total number of modes in the optical fiber having a core diameter of 600 $\mu$m and an numerical aperture of 0.22, in order to propagate ultraviolet light, whose wavelength is shorter than that of the visible light, the number of modes to be excited was limited, thereby failing to completely remove the speckle pattern.

A laser-light generating unit that generates a sum frequency, such as the one illustrated in FIG. 3, is known. In this unit, an external resonator 200 similar to the 266-nm laser-light generating unit shown in FIG. 1 is used. Resonance is then produced in light emitted from at least one of the two types of fundamental-wave light sources 11 and 111, thereby generating laser light having a frequency of 355 nm or 213 nm, which is the sum of the two fundamental waves having different frequencies. This laser-light generating unit, as well as the unit shown in FIG. 1, is vulnerable to vibrations.

A fluorescent measurement technique for observing specimens is also known. In this technique, a specimen is excited by light having a short wavelength, such as far-ultraviolet light having a wavelength of 266 nm, to generate florescent light. The generated florescent light is then measured to analyze the specimen. In this technique, it is necessary to oscillate the exciting light in a pulsating manner according to the lifetime of the fluorescent light. If the pulsating oscillation time is shorter than the time required for averaging a speckle pattern caused by a multi-mode fiber, a non-uniform intensity distribution of the fluorescent light corresponding to a speckle pattern is generated. Hence, a certain measure should be taken for overcoming this drawback.

Further, ultraviolet light finds widespread applications, such as illumination, exposure, measurements for fluorescent light, and so on. However, the ultraviolet light having a wavelength of 200 to 400 nm may adversely and seriously affect human bodies, even generating a skin cancer after being exposed to the light for a long time. Accordingly, by applying ultraviolet light emitted from the above known laser-light generating units to a variety of apparatuses, there may be the possibility of the operator being exposed to ultraviolet light on various occasions, such as in adjusting the optical axis, required during installation and maintenance of such apparatuses. Further safety precautions are required for the operation.

SUMMARY OF THE INVENTION

Accordingly, in order to solve the above-described problems, it is an object of the present invention to provide a light source unit in which the length of a resonator used in the light source unit and the correct position of the optical axis remain unchanged, even by vibrations, so as to obtain a uniform and stable light output, and in which the possibility of jeopardizing human bodies by laser light on occasions, such as adjustment and maintenance of the light source unit, is lessened.

It is another object of the present invention to provide an optical measurement apparatus and an exposure apparatus, both of which use the above-described light source unit as a light source.

In order to achieve the above objects, according to one form of the present invention, there is provided a light source unit including a wavelength converter which has at least a pair of reflection means and a non-linear optical crystal device. In the wavelength converter, fundamental-wave laser light emitted from one fundamental-wave light source is input into generate second higher-harmonic laser light. Alternatively, fundamental-wave laser light emitted from a plurality of fundamental-wave light sources is input into generate sum-frequency laser light. A modulator spatially modulates the laser light generated by the wavelength converter. An optical waveguide propagates laser light from the modulator to a given optical apparatus. Further, the wavelength converter, the modulator, and the optical waveguide are mechanically separated. Vibration isolating means are provided for any of the combinations: the wavelength converter only, the wavelength converter and the modulator, and the wavelength converter, the modulator and the optical waveguide.

In the foregoing light source unit, a visible or infrared light source may be provided within the modulator, and a shutter mechanism for shielding the laser light generated by the wavelength converter and a dichroic mirror may be provided in the optical path of the laser light. By using this dichroic mirror, the visible light or the infrared light may be synthesized with the laser light generated by the wavelength converter.

Further, according to another form of the present invention, there is provided an optical measurement apparatus using as a light source light output from the foregoing light source unit.

According to a further form of the present invention, there is provided an exposure apparatus using as a light source light output from the foregoing light source unit.

The above-described shutter mechanism and the visible light or the infrared light may be used in adjusting the optical axis, the focal point, and the light-applying position of the above apparatuses. Moreover, the measuring period of the optical measurement apparatus and the exposure time of the exposure apparatus may be an integral multiple of the modulation period of the modulator.

Generally, while the laser light propagates in an optical fiber, a non-uniform speckle pattern is generated due to laser light coherence in which the intensity distribution randomly varies. To prevent the generation of a speckle pattern, the laser light is spatially modulated. Since the spatial modulation is performed by slightly changing the optical axis, mechanical vibrations are produced. However, vibration isolating means are provided for the light source unit of the present invention, stable light output is ensured.

Further, in the optical measurement apparatus or the exposure apparatus, since the measuring period or the exposure time is an integral multiple of the spatial modulation period, the speckle noise is averaged, thereby achieving substantially uniform intensity distribution.

BRIEF DESCRIPTION OF THE DRAWINGS

FIG. 6 is a schematic diagram illustrating an exposure apparatus using the light source unit of the present invention;

FIG. 7 is a schematic diagram illustrating a sum-frequency generating unit using an external resonator; and FIG. 8 is a schematic diagram illustrating a projection display apparatus using the light source unit of the present invention.

DESCRIPTION OF THE PREFERRED EMBODIMENT

Figure 1:
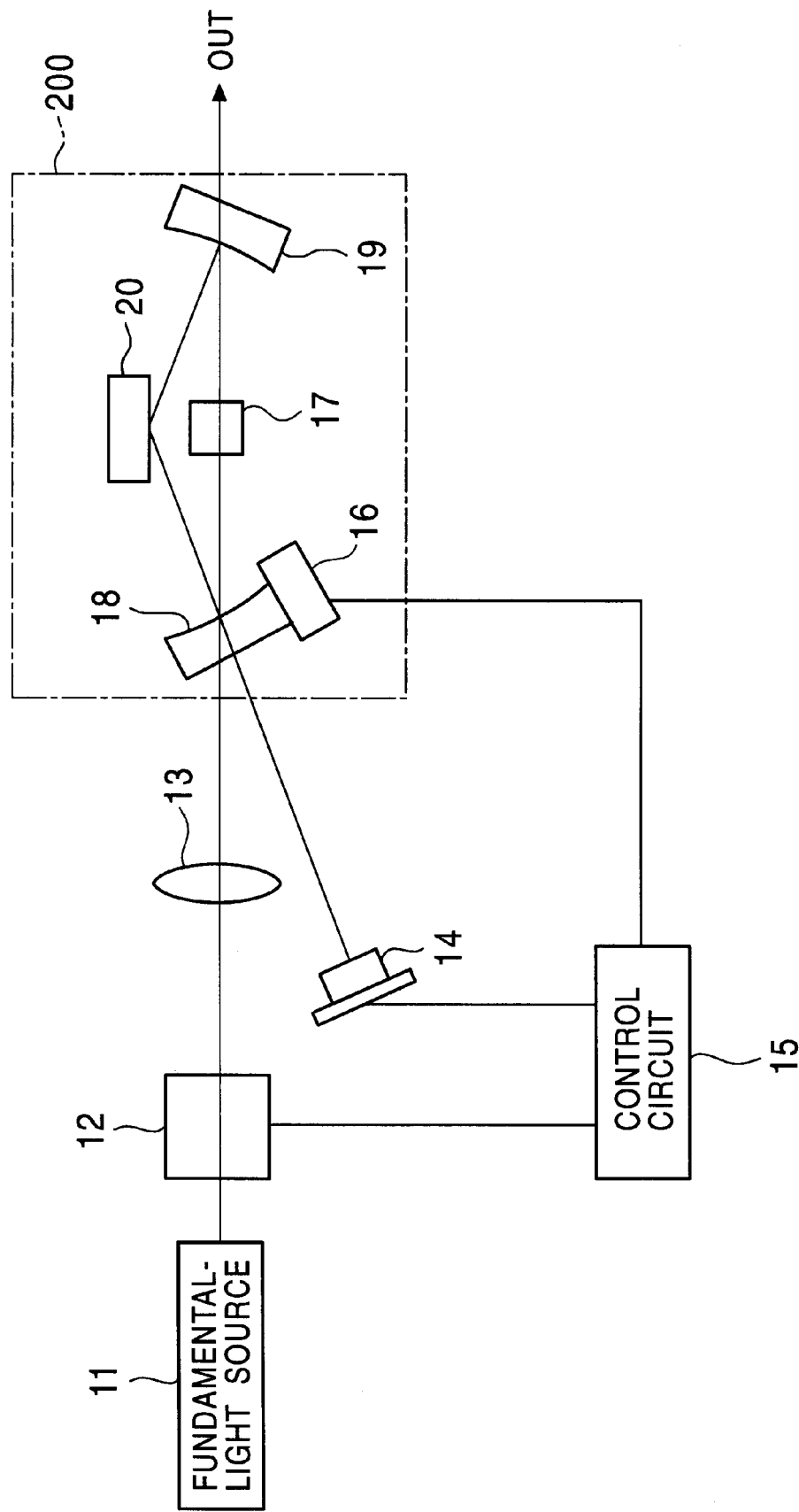
FIG. 1 is a schematic diagram illustrating a known laser-light generating unit.
Figure 2:
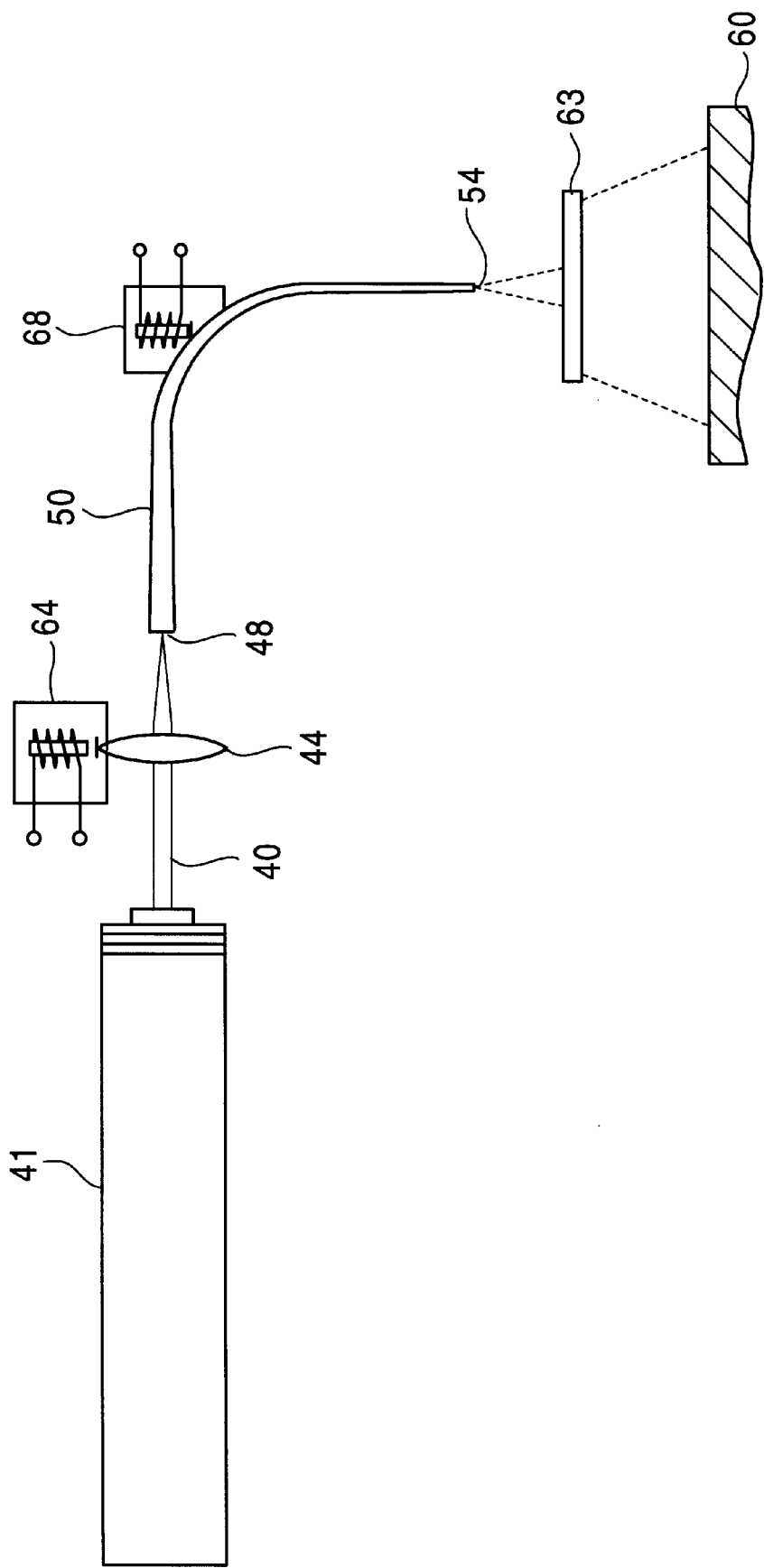
FIG. 2 illustrates a known method for removing a speckle pattern.
Figure 3:
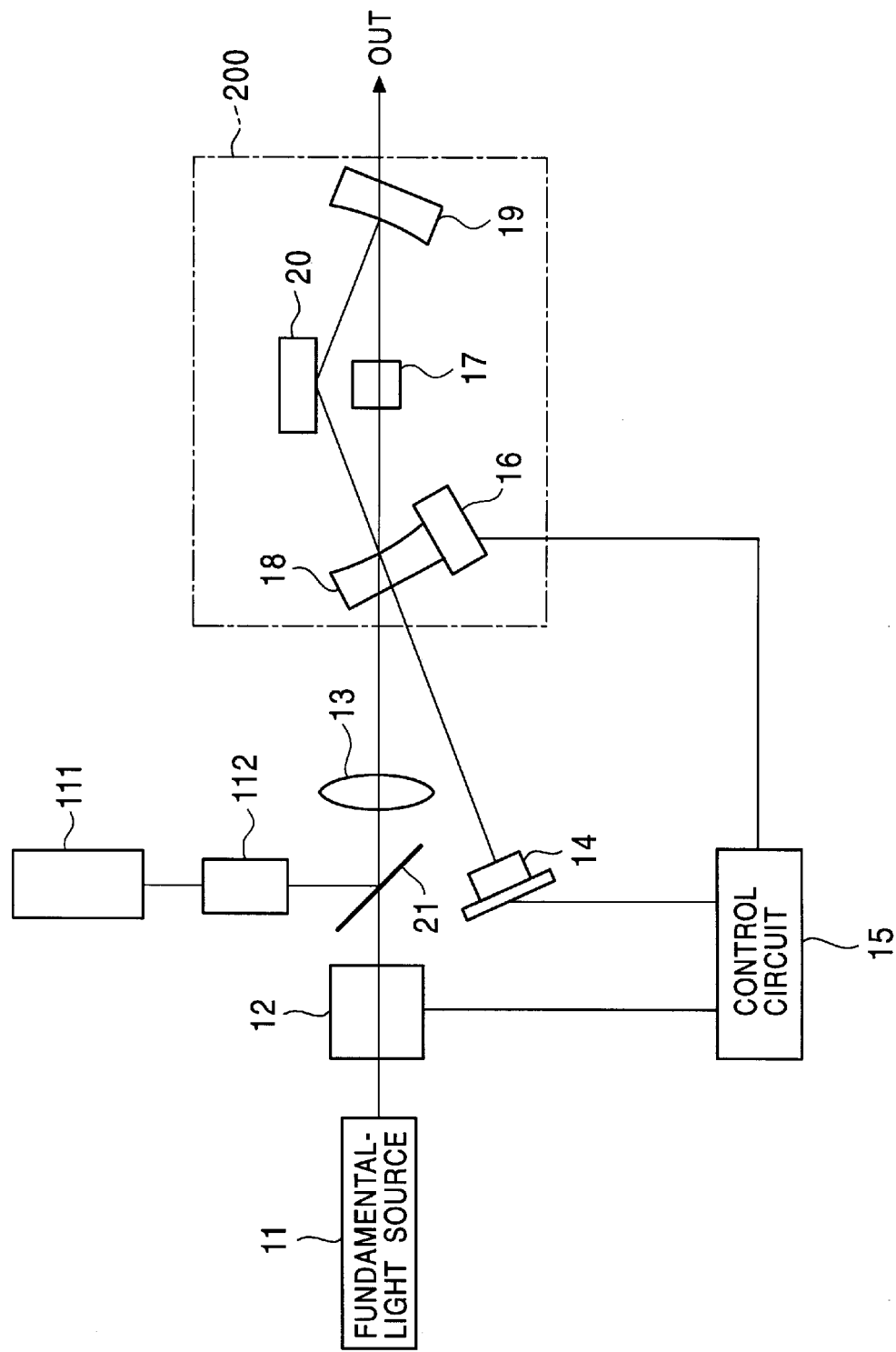
FIG. 3 is a schematic diagram illustrating a known sum-frequency generating unit.

An embodiment of the present invention is described in detail below with reference to the drawings. The same elements and functions as those described in the related art are indicated by like reference numerals.

Figure 4:
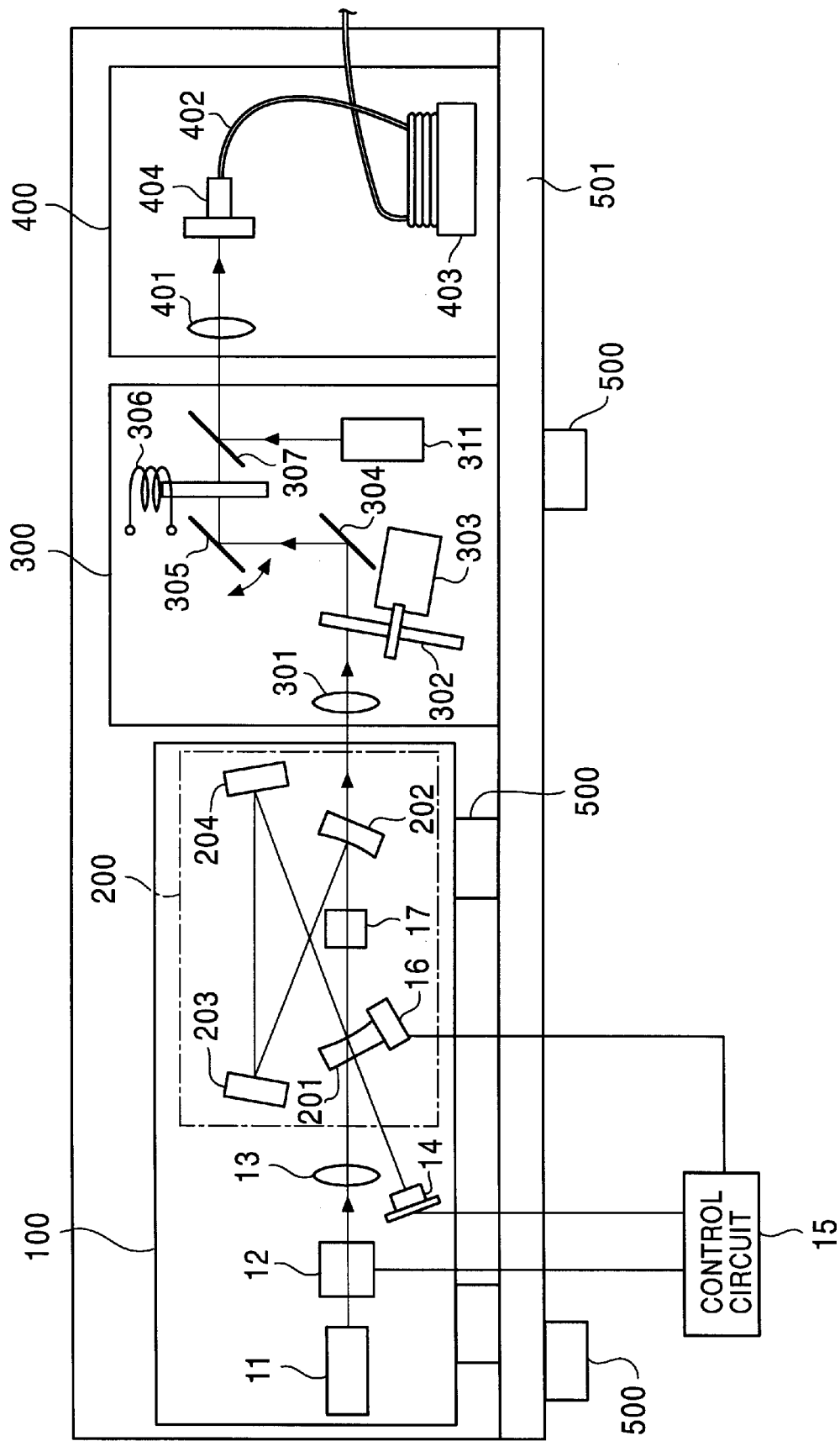
FIG. 4 is a schematic diagram illustrating a light source unit according to an embodiment of the present invention.

FIG. 4 is a schematic diagram illustrating a light source unit according to an embodiment of the present invention. The light source unit shown in FIG. 4 is formed of the following elements. A wavelength converter 100 converts fundamental laser light into a second higher harmonic wave. A modulator 300 spatially modulates the output light from the wavelength converter 100. An optical waveguide 400 allows the modulated laser light to propagate to a given optical apparatus. The light source unit also includes vibration isolating members 500, which serves as vibration isolating means, and a base plate 501.

The wavelength converter 100 has a fundamental-wave light source 11 for emitting fundamental-wave laser light, a phase modulator 12, a condenser lens 13, a ring-type external resonator 200, which is formed of four mirrors 201, 202, 203 and 204, and a non-linear optical crystal device 17. A photo-detector 14, a control circuit 15, and an electromagnetic actuator 16 are also provided for adjusting the length of the resonator.

The modulator 300 includes a collimator lens 301, a diffraction optical device 302, a mirror 304, a galvanic mirror 305, and a dichroic mirror 307, all of which form the optical system within the modulator 300. The modulator 300 also has an optical-axis adjusting light source 311 for adjusting the optical axis in the visible light range, an electromagnetic shutter 306, which is operatively cooperated with the light source 311, and a motor 303 for rotating the diffraction optical device 302.

The optical waveguide 400 has a condenser lens 401, an optical fiber 402, a vibrator 403, and an optical connector 404.

The operation of the embodiment constructed as described above is described in detail with reference to FIG. 4. In this embodiment, 532-nm green laser light, which is emitted from the fundamental-wave light source 11, is incident on the ring-type external resonator 200 via the phase modulator 12 and the condenser lens 13. Resonance is then produced by the external resonator 200 that is formed of two concave mirrors and two plane mirrors, as specified in Table 2.

TABLE 2

| Mirror | Radius of curvature | Fundamental-wave reflectivity (532 mm) | SHG light transmittance (266 nm) |
| --- | --- | --- | --- |
| 201 | 100 mm | 98.8% | — |
| 202 | 100 mm | 99.9% | 90.0% or higher |
| 203 | Flat | 99.9% | — |
| 204 | Flat | 99.9% | — |

The 532-nm laser light is further converted into 266-nm laser light, which is a second higher harmonic wave of the fundamental wave, by the non-linear optical crystal device 17 located in the optical path. The 266-nm laser light output from the external resonator 200 is detected by the photo-detector 14, and a detection signal is input into the control circuit 15. Upon receiving the detection signal from the photo-detector 14 and a frequency error signal from the phase modulator 12, the control circuit 15 causes the electromagnetic actuator 16 to position the mirror 201 to maximize the resonance of the incident light. The method for the above position control is disclosed in Japanese Unexamined Patent Publication No. 5-243661.

Although β-$BaB_2O_4$ (BBO) is used as the above-described non-linear optical crystal device 17, any one of $CsLiB_6O_{10}$ (CLBO), $KTiOPO_4$ (KTP), $LiNbO_3$ (LN), $LiB_3O_5$ (LBO), and $KNbO_3$ (KN) may be used.

Further, the vibration isolating members 500, such as a pneumatic spring, a metal spring, or a rubber damper, are fixed to the bottom of the wavelength converter 100 and mounted on the base plate 501. The modulator 300 and the optical waveguide 400 are mechanically separated to prevent the propagation of vibrations between the two elements. The modulator 300 and the optical waveguide 400 are also mounted on the same base plate 501, thereby stabilizing the optical axis along which laser light propagates. An extra vibration isolating member 500, which is not provided for the modulator 300 and the optical waveguide 400 in this embodiment, may further inhibit vibrations. The provision of such vibration isolating means prevents any change in the length of the resonator or in the optical axis.

As discussed above, in propagating a second higher-harmonic wave obtained by the wavelength converter 100 through a transverse multi-mode optical fiber into an optical apparatus, such as an exposure apparatus, a non-uniform speckle pattern is generated in which the intensity distribution randomly varies due to laser light coherence. The generation of such a speckle pattern prevents the use of the above light source unit as a light source for an optical apparatus, such as an exposure apparatus. One of the measures to eliminate the speckle pattern is to vibrate the incident light axis or the optical waveguide so as to average the non-uniform speckle pattern, thereby achieving a uniform intensity distribution. This is achieved by the modulator 300 and the optical waveguide 400 of this embodiment.

The light output from the wavelength converter 100 enters the modulator 300 in which the light is converted into a parallel beam by the collimator lens 301 and further propagates through the mirror 304, the galvanic mirror 305, and the dichroic mirror 307. In the modulator 300, the optical axis of the output beam is slightly altered by changing the optical path, thereby averaging the speckle pattern. While the beam propagates within the optical fiber 402 via the condenser lens 401, the optical fiber 402 is vibrated by the vibrator 403 provided in the optical waveguide 400, thereby accelerating the removal of the speckle pattern.

As the optical fiber 402, a silica optical fiber having a core diameter of 600 $\mu$m and a numerical aperture of 0.22, which is suitably used for illumination and exposure, is employed. An optical fiber having a core diameter of 50 to 2000 $\mu$m may be used depending on the condition of the illumination and the exposure. Additionally, the optical fiber 402 is easy to attach and detach by the use of the optical connector 404.

In this embodiment, the focal length of the collimator lens 301 is 250 mm, while the focal length of the condenser lens 401 is 50 mm, resulting in a reduction ratio of 5:1. A near field pattern of ultraviolet light generated by BBO, which forms the non-linear optical crystal device 17, is formed in an elliptical shape having a size of 70 $\mu$m×500 $\mu$m by virtue of a walk-off effect due to the complex refraction produced by BBO. Since the near field pattern is reduced to a size of 14 $\mu$m×100 $\mu$m at the input face of the optical fiber 402 due to the reduction ratio of 5:1, it can be efficiently coupled to the optical fiber 402 having a core diameter of 600 $\mu$m.

Further, even including transmission loss and Fresnel loss incurred at the input face of the 5-meter long optical fiber 402, light can be obtained from the output face of the optical fiber 402 with approximately 70% efficiency.

In this manner, since the core diameter of the optical fiber 402 is sufficiently large to accommodate the spot size of the beam, a slight deviation of the optical axis is acceptable. The beam size after being collimated by the collimator lens 301 is about 1 mm, which does not hamper the coupling efficiency at all if the rubber damper used for the vibration isolating member 500 expands and contracts by a few hundreds of microns.

The lens system coupled to the optical fiber 402 or the mirrors in the optical path are partially vibrated to spatially modulate the distribution of the light coupled to the optical fiber 402. This makes it possible to average the speckle pattern caused by the coherence of the laser light, thereby achieving a uniform light distribution. In this embodiment, as means for spatially modulating light, the galvanic mirror 305 is used and electromagnetically vibrated. In place of the galvanic mirror 305, however, a polygonal mirror, a diffusion plate, a hologram device, or an optical lens may be used and vibrated by an electromagnetic device or a piezoelectric device.

In consideration of the 50-mm focal length f of the condenser lens 401, the light beam can be coupled to the optical fiber 402 having a core diameter d of 600 $\mu$m without impairing the coupling efficiency as long as the galvanic mirror 305 swings within a range of an angle q, i.e., d/f, of 12 mrad.

As has been discussed above, however, the foregoing spatial modulation means is merely effective for the visible light, but not for 266-nm ultraviolet laser light, resulting in a failure to completely remove the speckle pattern. It is thus necessary to increase the number of excited modes in the multi-mode fiber, as noted above.

In this embodiment, to meet the above requirement, the diffraction optical device 302 is inserted in the optical path of the modulator 300. Because of the provision of the diffraction optical device 302, the spot of the incident light of the optical fiber 402 can be changed from a single Gaussian beam into a plurality of peak spots in accordance with a diffraction pattern. This makes it possible to increase the number of excited modes in the multi-mode optical fiber, thereby enabling the removal of the remaining speckle pattern. A diffusion plate or a hologram device is preferably used for the diffraction optical device 302.

Moreover, a transmitting-type or reflecting-type diffraction optical device is used as the diffraction optical device 302, which is then vibrated, or rotated by the motor 303, as illustrated in FIG. 4, thereby temporally changing the diffraction efficiency or the angle of diffraction. The incident light is thus spatially modulated, and the speckle pattern is removed. As described in the provision of the galvanic mirror 5, if the angle of diffraction (total width) q, i.e., d/f, varies within 12 mrad, the light beam can be coupled to the optical fiber 402 without impairing the efficiency.

The foregoing light source unit is used for an optical measurement apparatus or an exposure apparatus, thereby forming an optical apparatus provided with a high-quality laser light source. A detailed description is given below of examples of such optical apparatuses formed by the light source unit of the present invention with reference to FIGS. 5 and 6.

Figure 5:
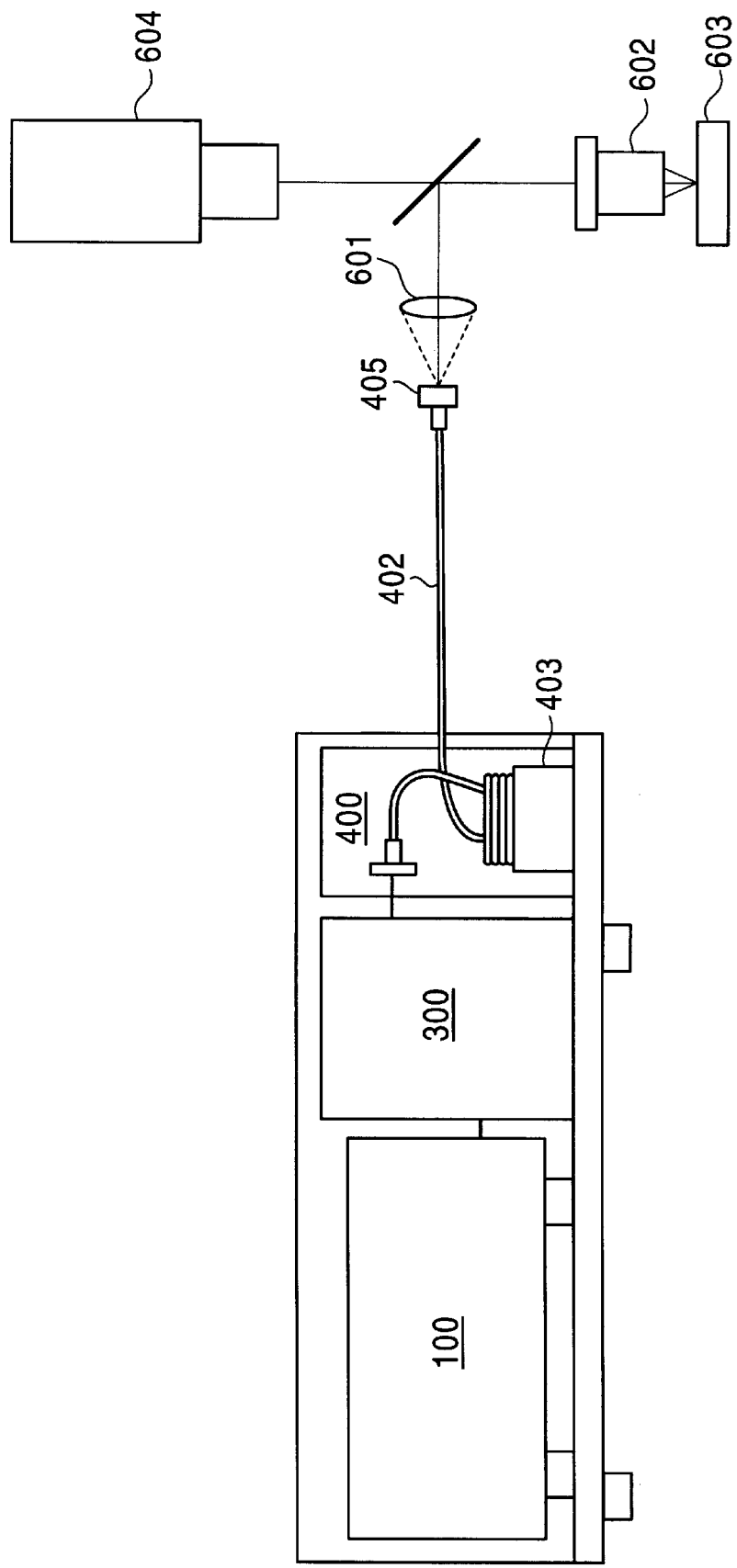
FIG. 5 is a schematic diagram illustrating an optical measurement apparatus using the light source unit of the present invention.

FIG. 5 is a schematic view of an optical measurement apparatus used in a microscope or for inspection of semiconductors. Light output from an optical waveguide 400, which acts as a light source, is incident on an optical measurement apparatus via a detachable optical connector 405. The light is applied to a specimen 603 via an illumination lens 601 and an objective lens 602, and the resulting light information is received by a detector 604 and is output as a detection signal of the specimen 603.

During the propagation of the laser light, the diffraction optical device 302, the galvanic mirror 305, and the vibrator 403 are driven to spatially modulate the laser light within the modulator 300. By using this modulation period or an integral multiple of the period, the detection signal output from the optical measurement apparatus is averaged, i.e., the little remaining speckle pattern is averaged and eliminated.

FIG. 6 illustrates an exposure apparatus formed by application of the light source unit of the present invention. As in the foregoing optical measurement apparatus, in this exposure apparatus, after laser light impinges on the exposure apparatus via an optical connector 405, the light distribution of the laser light is uniformly averaged by an illumination lens 605 and an integrator 606. The laser light is then applied to an exposure mask 608 via a condenser lens 607. The pattern of the exposure mask 608 is projected on a specimen 610, such as a photoresist covering a semiconductor device, through a projection exposure lens 609, thereby forming a pattern. In this operation, the exposure time is set at an integral multiple of the modulation period, thereby removing the remaining speckle pattern.

As noted above, a fluorescent measurement technique for observing specimens is known. In this technique, a specimen is excited by light having a short wavelength, such as far-ultraviolet light having a wavelength of 266 nm, to generate florescent light. The generated florescent light is then measured to analyze the specimen. In this technique, it is necessary to oscillate the exciting light in a pulsating manner according to the lifetime of the fluorescent light. If the pulsating oscillation time is shorter than the time required for averaging a speckle pattern due to a multi-mode fiber, a non-uniform intensity distribution of the fluorescent light corresponding to a speckle pattern is generated. Therefore, by using the light source unit of the present invention, as in the foregoing optical measurement apparatus and the exposure apparatus, a detection signal of a fluorescent measurement detector is averaged with the modulation period or an integral multiple of the period, thereby eliminating the intensity distribution of the fluorescent light.

Further, as discussed above, in the foregoing optical apparatuses utilizing ultraviolet light, there is the possibility of the operator being exposed to ultraviolet light on various occasions, such as in adjusting the optical axis, which is required during installation and maintenance of such apparatuses.

As a safety precaution against the above danger, as illustrated in FIG. 4, the light source unit of the present invention has a visible or infrared light source specifically used for adjusting the optical axis. Light output from the optical-axis adjusting light source 311 is synthesized with laser light from the galvanic mirror 305 via the dichroic mirror 307, and the synthesized light is coupled to the optical fiber 402. Consequently, the optical axis of the laser light from the galvanic mirror 305 and that of the output light from the light source 311 have been adjusted to match each other. Then, visible light or infrared light from the light source 311 can be used as a substitute for laser light in adjusting the optical axis, which is required during installation and maintenance. At this time, the electromagnetic shutter 306 shields the laser light, thereby eliminating the possibility of the operator being inadvertently exposed to ultraviolet light.

In observing specimens with a microscope, manual adjustments are sometimes required to roughly adjust the position of specimens and the focus of the optical axis. In this case, the optical-axis adjusting light source 311 can be effectively employed.

While the present invention has been described with reference to what are presently considered to be the preferred embodiments, it is to be understood that the invention is not limited to the disclosed embodiments. For example, the light source unit may be modified in such a manner that a plurality of external resonators for converting the wavelength of fundamental-wave laser light, such as the external resonator 200 shown in FIG. 4, may be connected in series to each other. Moreover, the wavelength converter 100 in the foregoing embodiment may be modified in the following manner, as shown in FIG. 7. An extra fundamental-wave light source 111, for example, a 1064-nm light source generating, such as a semiconductor Nd:YAG solid-state laser, may be added. The light from the extra light source 111 is synthesized with the light from the light source 11 by a dichroic mirror 21 via a phase converter 112, and resonance is produced in the synthesized light by the external resonator 200. As a result, speckle-free 355-nm or 213-nm laser light having a sum frequency can be stably formed.

Further, the light source unit of the present invention may be applied to a projection display apparatus, such as the one illustrated in FIG. 8. Referring to FIG. 8, light propagating through an optical fiber 402 is applied to a spatial light modulation device 612, which uses a liquid crystal light valve, via an illumination lens 611. The spatially modulated light representing, for example, a moving-picture pattern, is then projected on a screen 614 via a projection lens 613. Thus, a large-screen and speckle-free projection display apparatus can be implemented.

What is claimed is:

1. A light source unit comprising:
    a wavelength converter including at least a pair of reflection means and a non-linear optical crystal device, into which fundamental-wave laser light emitted from one fundamental-wave light source is input to generate second higher-harmonic laser light, or into which fundamental-wave laser light emitted from a plurality of fundamental-wave light sources is input to generate sum-frequency laser light;
    a modulator for spatially modulating the laser light generated by said wavelength converter; and
    an optical waveguide for propagating laser light from said modulator to a given optical apparatus,
    said wavelength converter, said modulator, and said optical waveguide being mechanically separated,
    wherein vibration isolating means are provided for said wavelength converter, said wavelength converter and said modulator, or said wavelength converter, said modulator and said optical waveguide.

2. A light source unit according to claim 1, wherein said vibration isolating means comprises at least one of a pneumatic spring, a metal spring, and a rubber damper.

3. A light source unit according to claim 1, wherein said modulator comprises an optical device and said optical device vibrates or rotates so as to spatially modulate the laser light generated by said wavelength converter.

4. A light source unit according to claim 3, wherein said optical device comprises any one of a galvanic mirror, a polygonal mirror, a diffusion plate, a hologram device, and an optical lens.

5. A light source unit according to claim 1, wherein said optical waveguide comprises an optical fiber.

6. A light source unit according to claim 5, wherein said optical fiber comprises a silica optical fiber having a core diameter of 50 $\mu$m to 2000 $\mu$m.

7. A light source unit according to claim 1, wherein a semiconductor Nd:YAG solid-state laser is used for said fundamental-wave light source.

8. A light source unit according to claim 1, wherein said non-linear optical crystal device comprises any one of $\beta$-BaB$_2$O$_4$ (BBO), CsLiB$_6$O$_{10}$ (CLBO), KTiOPO$_4$ (KTP), LiNbO$_3$ (LN), LiB$_3$O$_5$ (LBO), and KNbO$_3$ (KN).

9. A light source unit according to claim 1, wherein a shutter mechanism for shielding the laser light generated by said wavelength converter is disposed in an optical path within said modulator.

10. A light source unit according to claim 1, wherein a light source unit for emitting visible light or infrared light is provided within said modulator, and a dichroic mirror is disposed within said modulator in the optical path of the laser light generated by said wavelength converter, and the visible light or the infrared light is synthesized with the laser light generated by said wavelength converter by said dichroic mirror.

11. An optical measurement apparatus comprising a light source unit, said light source unit comprising:

a wavelength converter including at least a pair of reflection means and a non-linear optical crystal device, into which fundamental-wave laser light emitted from one fundamental-wave light source is input to generate second higher-harmonic laser light, or into which fundamental-wave laser light emitted from a plurality of fundamental-wave light sources is input to generate sum-frequency laser light;

a modulator for spatially modulating the laser light generated by said wavelength converter; and an optical waveguide for propagating laser light from said modulator to a given optical apparatus, said wavelength converter, said modulator, and said optical waveguide being mechanically separated, wherein vibration isolating means are provided for said wavelength converter, said wavelength converter and said modulator, or said wavelength converter, said modulator and said optical waveguide.

12. An optical measurement apparatus according to claim 11, wherein said light source unit has a light source for emitting visible light or infrared light, and the visible light or the infrared light is used for adjusting the optical axis, the focal point, and the light-applying position of said optical measurement apparatus.

13. An optical measurement apparatus according to claim 11, wherein a measuring period of said optical measurement apparatus is an integral multiple of a modulation period of said modulator.

14. An exposure apparatus comprising a light source unit, said light source unit comprising:

a wavelength converter including at least a pair of reflection means and a non-linear optical crystal device, into which fundamental-wave laser light emitted from one fundamental-wave light source is input to generate second higher-harmonic laser light, or into which fundamental-wave laser light emitted from a plurality of fundamental-wave light sources is input to generate sum-frequency laser light;

a modulator for spatially modulating the laser light generated by said wavelength converter; and an optical waveguide for propagating laser light from said modulator to a given optical apparatus, said wavelength converter, said modulator, and said optical waveguide being mechanically separated, wherein vibration isolating means are provided for said wavelength converter, said wavelength converter and said modulator, or said wavelength converter, said modulator and said optical waveguide.

15. An exposure apparatus according to claim 14, wherein said light source unit has a light source for emitting visible light or infrared light, and the visible light or the infrared light is used for adjusting the optical axis, the focal point, and the light-applying position of said exposure apparatus.

16. An exposure apparatus according to claim 14, wherein an exposure time of said exposure apparatus is an integral multiple of a modulation period of said modulator.

* * * * *